United States Patent
Reiner

(10) Patent No.: US 6,865,619 B1
(45) Date of Patent: Mar. 8, 2005

(54) METHOD FOR CONTROLLING THE STATUS OF A DRIVE OF AN APPARATUS FOR READING FROM AND/OR WRITING TO RECORDING MEDIA

(75) Inventor: Gerhard Reiner, Villingen-Schwenningen (DE)

(73) Assignee: Thomson Licensing S. A., Boulogne-Billancourt (FR)

( * ) Notice: Subject to any disclaimer, the term of this patent is extended or adjusted under 35 U.S.C. 154(b) by 0 days.

(21) Appl. No.: 10/285,982

(22) Filed: Nov. 1, 2002

(51) Int. Cl.[7] .................................................. G06F 3/00
(52) U.S. Cl. ............................. 710/17; 710/15; 710/18; 710/19
(58) Field of Search ............................. 710/15, 17, 18, 710/19

(56) References Cited

U.S. PATENT DOCUMENTS 4,736,356 A * 4/1988 Konshak .................... 369/77.2
2001/0019526 A1 * 9/2001 Takeda ....................... 369/75.2
2002/0136131 A1 * 9/2002 Turner et al. ............. 369/53.28

FOREIGN PATENT DOCUMENTS

JP     2001-280002 A  * 10/2001

* cited by examiner

Primary Examiner—Jeffrey Gaffin
Assistant Examiner—David Martinez
(74) Attorney, Agent, or Firm—Joseph S. Tripoli; Harvey D. Fried; Patricia A. Verlangieri

(57) ABSTRACT

A method for controlling the status of a drive of an apparatus for reading from and/or writing to recording media is proposed. According to the method, a plurality of drive states are reported to a controller of the apparatus by applying drive state signals to an interface. To ensure that no drive state remains unnoticed by the controller, the drive state signals are applied to the interface for at least a predetermined period of time, even if one or more drive state actually lasts for a shorter period of time. To guarantee that the drive state reported to the controller is identical to the real state of the drive, one or more of the drive states, which last shorter than the predetermined period of time are artificially extended.

12 Claims, 1 Drawing Sheet

METHOD FOR CONTROLLING THE STATUS OF A DRIVE OF AN APPARATUS FOR READING FROM AND/OR WRITING TO RECORDING MEDIA

BACKGROUND OF THE INVENTION

The present invention relates to a method for controlling the status of a drive of an apparatus for reading from and/or writing to recording media.

An apparatus for reading from and/or writing to recording media generally comprises, among other components, a drive for accommodating and accessing a recording medium, and electronic circuitry, e.g. for controlling the drive or for processing the data obtained from the recording medium. It is well known in the art, e.g. from optical disc drives, to provide a drive with means for controlling certain conditions of the drive. For example, in many drives detectors are provided which determine if a tray for accommodating the recording medium is fully extracted from ("tray open") or retracted into ("tray closed") the drive. However, this status information or drive state is only used by the drive, it is not reported to the controller.

To make the operation of the drive more transparent to the apparatus for reading from and/or writing to recording media, it is desirable to make the drive status information available to the controller. Recent drives have, therefore, been provided with an interface, which is used for reporting the drive status information to an external controller. In addition, a plurality of additional drive states has been introduced. Further to the known drive states "tray open" and "tray closed", the additional drive states indicate if the tray is in process of opening or closing or-if a recording medium has been detected. In this way the controller is always informed about the status of the drive. This information can be used, for example, to prevent conflicting operations like trying to access the recording medium when the tray is in process of opening or closing. In this way operation errors are avoided. However, it might happen that the drive states change so fast that one or more drive states are not noticed by the controller. This can cause an erroneous operation of the drive.

SUMMARY OF THE INVENTION

The invention provides a method for controlling the status of a drive of an apparatus for reading from and/or writing to recording media, which eliminates the above disadvantages and allows to reliably report the drive states to the controller.

According to the invention, this object is achieved by a method comprising the steps of:

reporting a plurality of drive states to the controller by applying drive state signals to an interface, and;

applying the drive state signals to the interface for at least a predetermined period of time even if one or more drive states last for a shorter period of time.

By choosing the predetermined period of time sufficiently long no drive state will remain unnoticed by the controller. To guarantee that the drive state reported to the controller is identical to the real state of the drive, according to the invention some drive states are artificially extended, i.e. the drive waits for a certain period of time before it changes from one drive state to another drive state. According to the invention it is also possible that the drive may change to certain predetermined drive states without waiting for the predetermined period of time to elapse, e.g. because it is assured that the controller does not attempt to access the drive in the currently reported state. This allows for a faster operation of the drive. It also lies within the scope of the invention to define different periods of time for different drive states or to define drive states which do not need to be applied to the interface for the predetermined period of time, e.g. because they are not important during specific operation conditions of the drive.

Favorably, a drive state is reported to the controller only when the specific drive state has been finally established. This is a further measure to ensure that the drive state reported to the controller is identical to the real drive state of the drive. Otherwise a drive state could be reported to the controller too soon and conflicting processes could occur. For example, if the drive state "tray closed" was reported to the controller before the drive state has been finally established, the apparatus for reading from and/or writing to recording media might try to access the recording medium while the tray is still in process of closing. As before, it is also possible to define drive states which do not fall under the above restriction.

Advantageously, the method further comprises the steps of checking if a transition between two drive states corresponds to one of a plurality of predefined allowed transitions, and concluding an illegal condition if this is not the case. For example, the drive state cannot change from the state "tray open" to the state "tray closed" without first changing to the drive state "closing". In this way for each drive state the controller knows exactly to which other drive states the drive might change, so that no unexpected situations can occur. The appearance of a forbidden transition between drive states indicates the occurrence of an error. Depending on the operation conditions of the drive, different allowed drive state transitions can be defined. For example, during reading from a recording medium other transitions than during writing to the recording medium might apply. The predefined transitions can, for example, be used to prevent that an authorized recording medium is replaced by an illegitimate copy by using an emergency eject button after authorization was checked with the authorized recording medium.

Favorably, the drive states comprise states indicating the status of a drive tray or states indicating the status of a recording medium present in the drive or both types of states. These states are sufficient for most controlling purposes. On the one hand, the states indicating the status of the drive tray relate to the movement of the tray and indicate, for example, if the tray is open or closed or in process of opening or closing. On the other hand, the states indicating the status a recording medium present in the drive indicate, for example, if a recording medium has been detected or if the drive is in process of unloading the recording medium. Of course, a plurality of other drive states such as different types of errors can also advantageously be reported to the controller according to the invention.

According to the invention, the drive states comprise a state indicating that no recording medium or an incompatible recording medium has been detected in the drive. If this information is reported to the controller, the apparatus for reading from and/or writing to recording media will not try to access the recording-medium. This prevents that the apparatus for reading from and/or writing to recording media is stalled waiting for data to be read from the recording medium until a time-out occurs and the apparatus stops its attempt to access the recording medium.

Favorably, a drive for use in an apparatus for reading from and/or writing to recording media performs a method according to the invention. Such a drive has the advantage that its operation is fully transparent to the apparatus for reading from and/or writing to recording media, so that no conflicting processes occur. The inventive drive can be used in a plurality of devices, e.g. in optical or magnetical disk drives, game consoles, tape drives etc.

Advantageously, a drive for use in an apparatus for reading from and or writing to recording media comprises means for reporting a plurality of drive states to a controller by applying drive state signals to an interface, and means for extending the drive states applied to the interface to a predetermined period of time even if one or more drive states last for a shorter period of time. Such a drive is capable of performing a method according to the invention.

BRIEF DESCRIPTION OF THE DRAWINGS

For a better understanding of the invention, exemplary embodiments are specified in the following description of advantageous configurations with reference to the figures. It is understood that the invention is not limited to these exemplary embodiments and that specified features can also expediently be combined and/or modified without departing from the scope of the present invention. In the figures:

In FIG. 1 an apparatus 1 for reading from and/or writing to recording media is shown. In this example, the apparatus 1 is constructed for optical disks such as CD (Compact Disk) or DVD (Digital Versatile Disk), etc. The apparatus 1 comprises a disk drive 2 for accessing an optical disk, and a controller 6 for controlling the disk drive 2 or processing the data obtained from the optical disk. The disk drive 2 is provided with a tray 3 having a recess 4 for accommodating the optical disk. The tray 3 can be extracted from or retracted into the disk drive 2 for enabling a user to insert an optical disk into or remove an optical disk from the apparatus 1. The disk drive 2 further comprises an interface 5 for reporting drive states to the controller 6. The interface 5 is connected to the controller 6 with a cable 7. Of course, other means for connecting the interface 5 to the controller 6, such as optical fibers or printed circuits, can also be used. Every time the state of the disk drive 2 changes, e.g. because the tray 3 is extracted from the disk drive 2 to insert a new optical disk, the new drive state is reported to the controller 6 via the interface 5. In this way the controller 6 is always informed about the status of the disk drive 2, which allows to prevent conflicting processes or errors upon accessing the optical disk.

FIG. 2 shows a block diagram of a method according to the invention. It is assumed that a drive state $DS_{n-1}$ is being applied to the interface 5. In a first step 10 the next drive state $DS_n$ is detected. This drive state $DS_n$ is compared with the previous drive state $DS_{n-1}$ in a comparing step 11. In case the drive state $DS_n$ is equal to the previous drive state $DS_{n-1}$ the drive state $DS_{n-1}$ is further applied to the interface 5 and the method returns to the detecting step 10. If, however, the drive state $DS_n$ is not equal to the previous drive state $DS_{n-1}$, i.e. a new drive state $DS_n$ is detected, in a step 12 a timer t is set to zero and started. At the same time in a step 13 a minimum period of time $t_{min}(DS_n)$ for the specific drive state $DS_n$ is determined, e.g. from a table. In the next step 14 the new drive state $DS_n$ is applied to the interface 5. At the same time the drive 2 is prevented from changing to another drive state $DS_{n+1}$. It is, however, possible to define certain drive states or transitions which do not fall under this restriction. In this case the drive 2 can change to the next drive state $DS_{n+1}$ even though the minimum period of time $t_{min}$ has not yet elapsed. This information can, for example, be stored together with the minimum period of time $t_{min}(DS_n)$ in the table. A further checking step 15 compares the timer t with the minimum period of time $t_{min}$. In case the elapsed time is less than the minimum period of time $t_{min}$, the method returns to the step 14 and continues to apply the new drive state $DS_n$ to the interface 5. Otherwise, if the minimum period of time $t_{min}$ has already elapsed, the method returns to the detecting step 10, where the next drive state is detected. The method ensures that each drive state is is applied to the interface 5 for at least the minimum period of time. It is to be noted that the drive states are continuously applied to the interface 5, i.e. only when a new drive state is detected the signal applied to the interface 5 is changed.

FIG. 3 shows an example of a transition between two drive states. Depicted is the transition from an initial drive state 20 "tray open" to a final drive state 22 "tray closed" via an intermediate drive state 21 "closing". In the example, the intermediate drive state 21 "closing" would not last long enough to be securely acknowledged by the controller 6. Therefore, in a step 23 the disk drive 2 waits for a predetermined period of time before the final drive state 22 "tray closed" is applied to the interface 5 and reported to the controller 6. During the waiting step 23 the intermediate drive state 21 "closing" is applied to the interface 5 and reported to the controller 6. This ensures that the intermediate drive state 21 "closing" is acknowledged by the controller 6.

Figure 1:
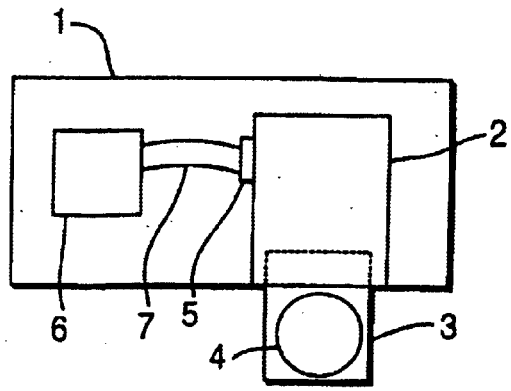
FIG. 1: shows an apparatus for reading from and/or writing to recording media according to the invention.
Figure 3:
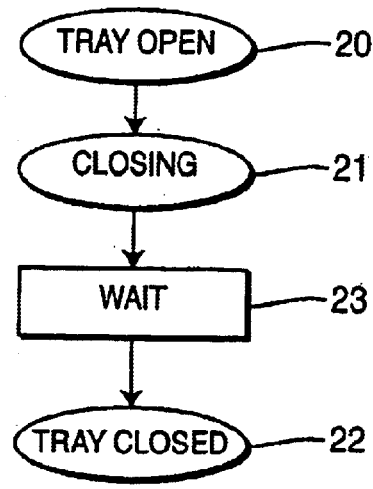
FIG. 3: shows an example of a transition between two drive states.
Figure 2:
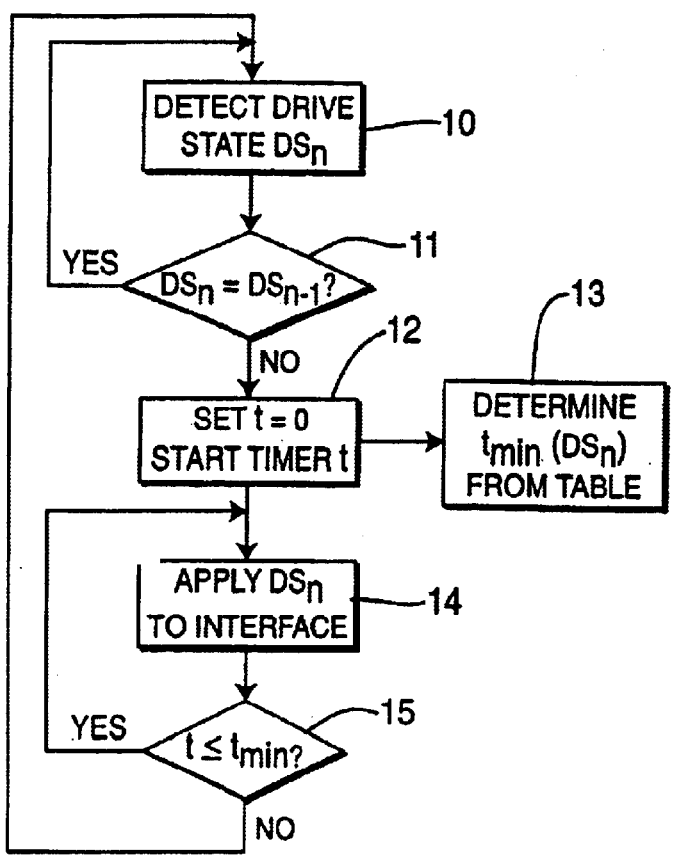
FIG. 2: shows a block diagram of a method according to the invention.

What is claimed is:

1. Method for controlling the status of a drive of an apparatus for reading from and/or writing to recording media, whereby the apparatus includes a controller, the method including the steps of:
   reporting a plurality of drive states to the controller by applying drive state signals to an interface;
   applying the drive state signals to the interface for at least a predetermined period of time even if one or more drive state lasts for a shorter period of time to ensure that the drive stare signals are detected by the controller, and;
   artificially extending one or more of the drive states which last shorter than the predetermined period of time.

2. Method according to claim 1, whereby a drive state is reported to the controller only when the specific drive state has been finally established.

3. Method according to claim 1, wherein different periods of time are predetermined for different drive states.

4. Method according to claim 1, further including the steps of checking if a transition between two active drive states corresponds to one of a plurality of predefined allowed transitions, and concluding an illegal condition if this is not the case.

5. Method according to claim 1, whereby the drive states include at least one of state indicating the status of a drive tray and at least one state indicating the status of a recording medium present in the drive.

6. Method according to claim 5, whereby the drive states include a state indicating that no recording medium or an incompatible recording medium has been detected in the drive.

7. Drive for use in an apparatus for reading from and or writing to recording media including:

means for reporting a plurality of drive states to a controller by applying drive state signals to an interface, whereby the drive state signals are applied to the interface for at least a predetermined period of time even if one or more drive state lasts for a shorter period of time, to ensure that the drive state signals are detected by the controller and; means for artificially extending one or more the drive states which last shorter than the predetermined period of time.

8. Drive according to claim 7, wherein different periods of time are predetermined for different drive states.

9. Drive according to claim 7, further including means for checking if a transition between two drive states corresponds to one of a plurality of predefined allowed transitions, and means for concluding an illegal condition if this is not the case.

10. Drive according to claim 7, whereby the drive states include at least one state indicating the status of a drive tray and at least one state indicating the status of a recording medium present in the drive.

11. Drive according to claim 10, whereby the drive states include a state indicating that no recording medium or an incompatible recording medium has been detected in the drive.

12. Apparatus for reading from and/or writing to recording media, having a drive including:

means for reporting a plurality of drive states to a controller by applying drive state signals to an interface, whereby the drive state signals are applied to the interface for at least a predetermined period of time even if one or more drive state lasts for a shorter period of time, to ensure that the drive state signals are detected by the controller, and;

means for artificially extending one or more of the drive states which last shorter than the predetermined period of time.

* * * * *